United States Patent [19]

Muller

[11] 4,047,453
[45] Sept. 13, 1977

[54] INDEXING ATTACHMENT FOR A DIVIDING HEAD

[75] Inventor: Henry J. Muller, Stamford, Conn.

[73] Assignee: Pitney-Bowes, Inc., Stamford, Conn.

[21] Appl. No.: 665,676

[22] Filed: Mar. 10, 1976

[51] Int. Cl.² .............................................. B23B 29/24
[52] U.S. Cl. ................................................. 74/813 R
[58] Field of Search .................. 74/813, 814, 815, 816

[56] References Cited

U.S. PATENT DOCUMENTS

| 223,088 | 12/1879 | Wolcott | 74/813 |
|---|---|---|---|
| 2,677,315 | 5/1954 | Hansen | 74/813 |
| 2,890,606 | 6/1959 | Wahlgren | 74/813 |

Primary Examiner—Samuel Scott
Assistant Examiner—Wesley S. Ratliff, Jr.
Attorney, Agent, or Firm—Robert S. Salzman; William D. Soltow, Jr.; Albert W. Scribner

[57] ABSTRACT

An indexing attachment is disclosed that is adapted for use with a Van Norman dividing head. The Van Norman dividing head has a rotatable chuck for indexing a workpiece at six minute intervals. The inventive attachment is placed upon the dividing plate of the head and increases the indexing capability of the dividing head, such that 1 minute intervals of rotation are obtained. The attachment comprises a disc having a cylindrical stem extending from a mid-portion thereof. The stem is placed in any one of several holes disposed in the dividing plate. The disc of the attachment contains apertures arranged in a spiral pattern on its face. The apertures receive the retractable pin of the indexing arm of the head, in place of the holes of the dividing plate. The spiral pattern of the apertures of the attachment subdivide the interval spacing between successive holes of the dividing plate.

2 Claims, 5 Drawing Figures

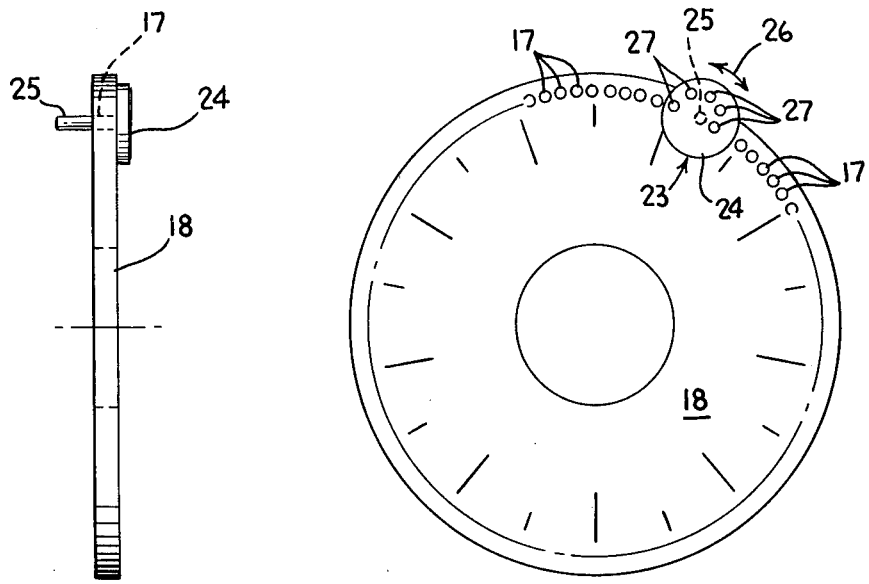
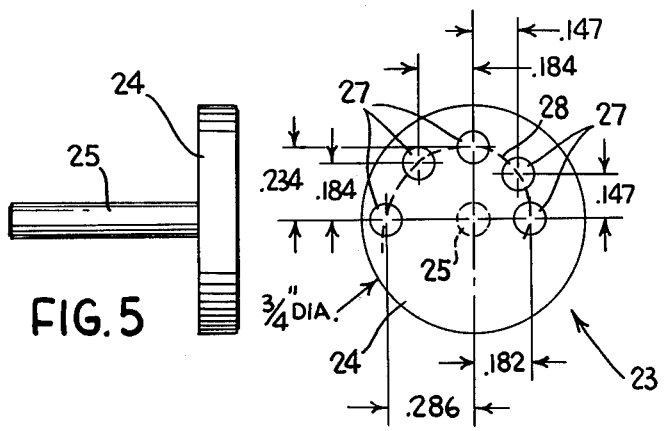
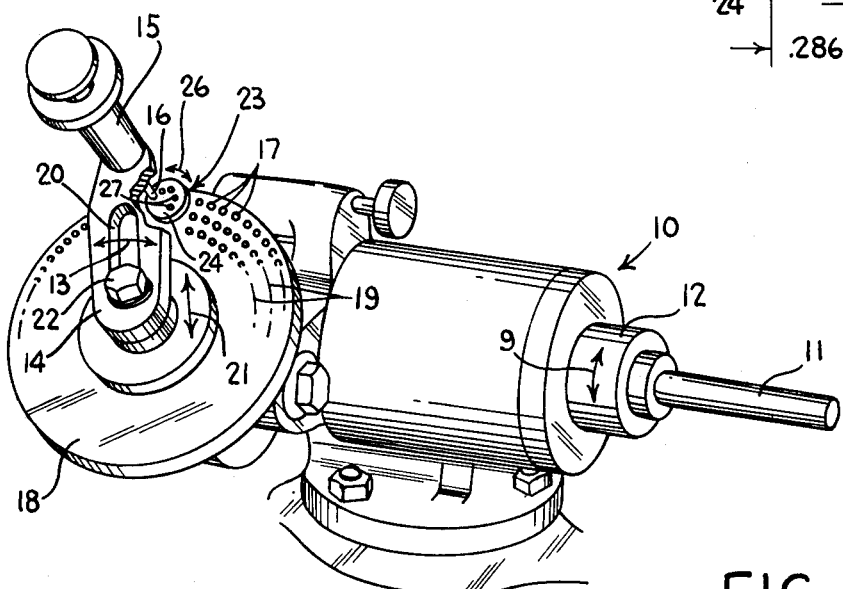

INDEXING ATTACHMENT FOR A DIVIDING HEAD

The invention pertains to an indexing apparatus for a dividing head, and more particularly to an easily adaptable attachment for a Van Norman dividing head.

BACKGROUND OF THE INVENTION AND PRIOR ART

The use of a Van Norman dividing head for indexing is well known to the skilled machinist. The dividing head provides increments of six (6) minutes of rotation for the chuck.

For different indexing increments, a special dividing plate is used. This dividing plate has several concentric circles of indexing holes disposed on a face thereof. Such a dividing plate can be seen in the Patent to J. Y. Scott et al, U.S. Pat. No. 2,059,753; issued: Nov. 3, 1936.

While the aforementioned dividing plate does an adequate job of providing different indexing capabilities, it does not have any means for further dividing the increments into finer subdivisions.

The present invention seeks to provide a simple attachment for the dividing plate of the Van Norman dividing head, which will easily provide an increased indexing capability.

The invention uses a principle similar to that shown in the protractor of CROSS, U.S. Pat. No. 2,718,062; issued: Sept. 20, 1955.

SUMMARY OF THE INVENTION

This invention relates to an indexing attachment for use with a dividing plate of a Van Norman dividing head. The indexing attachment comprises a disc having a cylindrical stem extending perpendicularly from a mid-portion thereof. The stem is adaptable for placement in any one of the apertures circumferentially arranged upon the dividing plate. Thus, the disc of the attachment will be disposed between the dividing plate and a retractable pin of an indexing arm of the dividing head. The disc of the attachment contains spaced apart apertures for receiving the retractable pin in place of the apertures of the dividing plate. The apertures of the disc are spaced apart in given increments in order to subdivide the spacing between successive apertures of the dividing plate. For example, the apertures of the disc attachment are generally arranged in a spiral pattern to subdivide the six (6) minute intervals of the outer ring of a 90 hole dividing plate into one (1) minute intervals. Finer subdivisions are of course possible with a change in the geometries and dimensions of the attachment and its associated parts. Also, different geometries and dimensions are required for other inner concentric rings of apertures.

It is an object of this invention to provide an improved indexing apparatus for a dividing head.

It is another object of the invention to provide an easily attachable mechanism to a standard dividing plate of a dividing head to increase its indexing capabilities.

These and other objects of this invention will become more apparent and will be more easily understood with reference to the following detailed description taken in conjunction with the attached drawings, in which:

FIG. 1 is a perspective, in situ view of the indexing attachment of this invention;

FIG. 2 is an enlarged frontal view of the inventive attachment disposed upon an indexing plate;

FIG. 3 is a side view of FIG. 2;

FIG. 4 is a dimensional, enlarged, front view of the inventive attachment shown in FIGS. 1 and 2;

FIG. 5 is a side view of FIG. 4.

Now referring to FIG. 1, a chuck end 10 of a Van Norman indexing head is shown having a workpiece 11 disposed in a rotatable chuck 12. The chuck 12 is caused to rotate (arrows 9) by means of the rotatable (arrows 13) indexing arm 14. The arm 14 normally carries a retractable pin mechanism 15, with a retractable pin 16 for placement in the indexing holes 17 of a dividing plate 18.

Different degrees of indexing are provided by the indexing plate 18 using the several concentric rings 19 of holes. In order for the pin 16 to align with the holes of the concentric rings 19, the arm 14 is provided with a slot 20 for radial movement (arrows 21) with respect to plate 18.

When the arm 14 is properly aligned, such that pin 16 is coincident with one of the desired concentric rings 19, the fastening nut 22 is tightened in place.

When a new ring 19 is desired for use, the nut is loosened and the arm 14 is be shifted via slot 20. When alignment with the new ring 19 is achieved, the nut 22 is again tightened.

The invention provides an easily securable attachment 23, that fits upon the dividing plate 18. The attachment 23 comprises a disc 24 and a stem 25 that perpendicularly extends from the middle of the disc 24 as shown in FIGS. 3 and 5.

The stem 25 of the attachment 23 is designed to fit within any one of the holes 17 on the outer ring on the periphery of the plate 18 (FIGS. 1 and 2).

Having inserted the stem 25 through one of the holes 17, the disc 24 is rotated (arrows 26) upon plate 18 as depicted in FIGS. 1 and 2. This is for the purpose of aligning one of the holes 27 of disc 24 in position to receive the pin 16.

The apertures 27 of the disc 24 subdivide the distance between any two successive holes 17 on the outer ring on plate 18, such that the six (6) minute rotational arc enjoyed by the chuck 12, can now be reduced to one (1) minute of arc.

In order to accomplish this, holes 27 must be carefully designed to have a given displacement upon the force of disc 24, as shown in FIG. 4.

Of course, other subdivisions are possible by increasing the size of attachment 23 and by using a different dimensional pattern for holes 27. Also, different dimensions and geometrics for the holes of the attachment are required for the other inner concentric holes of plate 18.

As will be noted from a careful purusal of FIG. 4, the holes 27 form a spiral 28 on the face of disc 24. A spiral pattern is useful to provide an ever increasing increment of indexing, although other patterns could be used to achieve the same objective. This is especially true for a larger diameter disc 24.

A greater degree of indexing is now obtainable with the use of attachment 23.

To reiterate, only one typical attachment 23 is shown for the outer ring (90 holes) of plate 18. It should be understood, however, that other attachments 23 can be provided for the other concentric rings 19 of apertures, as well as for a greater subdivision of the outer ring.

Having described the invention, what is sought to be protected by Letters Patent is presented by the appended claims.

What is claimed is:

1. In an indexing mechanism for a dividing head, an indexing attachment for use with a six minute interval circular dividing plate, said indexing attachment increasing the indexing capabilities of said dividing head, said dividing plate having apertures disposed at spaced intervals circumferentially about a peripheral portion thereof, each of said apertures adapted to receive a retractable pin of a rotatable indexing arm of said dividing head, said attachment comprising a one minute interval disc having a stem extending from a mid-portion thereof, said stem being adaptable for placement in any one of said apertures of said dividing plate such that said disc of said attachment will be disposed between the dividing plate and said retractable pin, said disc of said attachment is rotatable about its stem in order to align any of its apertures with the retractable pin of said indexing arm containing a plurality of spaced apart apertures for receiving the retractable pin in place of the apertures of said dividing plate, said apertures of said disc being arranged in a spiral pattern and spaced apart in given increments to subdivide the spacing between successive apertures of one ring of apertures of said dividing plate, whereby a greater indexing capability is provided for said dividing head.

2. The indexing attachment of claim 1, wherein said stem is cylindrical to easily fit within the apertures of the dividing plate, and wherein said stem extends perpendicularly from said disc.

* * * * *